(12) United States Patent
Spencer (10) Patent No.: US 11,440,460 B1
(45) Date of Patent: Sep. 13, 2022

(54) DIRECTIONAL HEADLAMP ASSEMBLY

(71) Applicant: Brian Spencer, Rockville, IN (US)

(72) Inventor: Brian Spencer, Rockville, IN (US)

( * ) Notice: Subject to any disclaimer, the term of this patent is extended or adjusted under 35 U.S.C. 154(b) by 0 days.

(21) Appl. No.: 17/361,481

(22) Filed: Jun. 29, 2021

(51) Int. Cl.
*B60Q 1/076* (2006.01)
*F21S 41/657* (2018.01)
*B60Q 1/00* (2006.01)

(52) U.S. Cl.
CPC ........... *B60Q 1/076* (2013.01); *B60Q 1/0076* (2013.01); *F21S 41/657* (2018.01)

(58) Field of Classification Search
CPC ....... F21S 41/657; B60Q 1/076; B60Q 1/068; B60Q 1/0683; B60Q 1/686
See application file for complete search history.

(56) References Cited

U.S. PATENT DOCUMENTS

| | | | |
|---|---|---|---|
| 3,953,726 A | * | 4/1976 | Scarritt, Sr. ............ B60Q 1/076 362/465 |
| 4,237,529 A | | 12/1980 | Mutschler |
| 4,241,260 A | | 12/1980 | Botz |
| 5,906,431 A | | 5/1999 | Chianale |
| 6,568,837 B2 | | 5/2003 | Denley |
| 7,445,365 B1 | | 11/2008 | Hsu |
| 7,500,768 B2 | | 3/2009 | Chen |
| D631,996 S | | 2/2011 | Froehlich |

FOREIGN PATENT DOCUMENTS

EP 3181402 12/2016

* cited by examiner

*Primary Examiner* — Robert J May (57) ABSTRACT

A directional headlamp assembly for independently directing light from a pair of headlamps includes a pair of headlamp modules and a controller. Each headlamp module replaces a respective headlamp of a pair of existing headlamps of a vehicle. The headlamp module comprises a first housing, which insertable of into an opening created upon removal of the respective headlamp, so that the first housing is engaged to the vehicle. A bulb is pivotally engaged to a front of the first housing. An actuator is engaged to and positioned in the first housing. The actuator is operationally engaged to the bulb. The controller is mountable within a passenger compartment of the vehicle so that it is accessible to a driver of the vehicle. The controller is independently and operationally engaged to each of the actuators and thus is positioned to selectively actuate each actuator to direct light emitted by an associated bulb.

12 Claims, 7 Drawing Sheets

DIRECTIONAL HEADLAMP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to directional headlamp assemblies and more particularly pertains to a new directional headlamp assembly for independently directing light from a pair of headlamps. The present invention discloses a headlamp assembly comprising a pair of headlamp modules mountable to a vehicle, with each headlamp module comprising an actuator and a bulb. The actuators are independently controlled by a controller mounted in a passenger compartment of the vehicle and can be selectively actuated to pivot the bulbs vertically and horizontally.

(2) Description of Related Art Including Information Disclosed Under 37 CFR 1.97 and 1.98

The prior art relates to directional headlamp assemblies, which may include motorized headlamps that can be selectively inclined, headlamps with adjustable reflectors, and the like. What is lacking in the prior art is a headlamp assembly comprising a pair of headlamp modules that are independently controlled by a controller mounted in a passenger compartment of the vehicle, which can selectively actuate actuators to pivot the bulbs vertically and horizontally.

BRIEF SUMMARY OF THE INVENTION

An embodiment of the disclosure meets the needs presented above by generally comprising a pair of headlamp modules and a controller. Each headlamp module is configured to replace a respective headlamp of a pair of existing headlamps of a vehicle. The headlamp module comprises a first housing, which defines an interior space and which is configured for insertion of into an opening created upon removal of the respective headlamp, so that the first housing is engaged to the vehicle. A bulb is pivotally engaged to a front of the first housing. An actuator is engaged to the first housing, positioned in the interior space, and is operationally engaged to the bulb. The controller is configured to be mountable within a passenger compartment of the vehicle, so that the controller is accessible to a driver of the vehicle. The controller is independently and operationally engaged to each of the actuators and thus is positioned to selectively actuate each actuator to direct light emitted by an associated bulb.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new directional headlamp assembly embodying the principles and concepts of an embodiment of the disclosure and generally designated by the reference numeral 10 will be described.

As best illustrated in FIGS. 1 through 7, the directional headlamp assembly 10 generally comprises a pair of headlamp modules 12 and a controller 14. Each headlamp module 12 is configured to replace a respective headlamp of a pair of existing headlamps (not shown) of a vehicle 16. The headlamp module 12 comprises a first housing 18, which defines an interior space 20 and which is configured to be inserted into an opening 22 created upon removal of the respective headlamp, so that the first housing 18 is engaged to the vehicle 16. A bulb 24 is pivotally engaged to a front 26 of the first housing 18.

An actuator 28 is engaged to the first housing 18, positioned in the interior space 20, and is operationally engaged to the bulb 24. The actuator 28 may comprise a first linear actuator 30 and a second linear actuator 32. The first linear actuator 30 is positioned at 90° relative to the second linear actuator 32. The first linear actuator 30 is positioned to pivot the bulb 24 in a first plane 34 substantially parallel to a plane 36 defined by wheels 38 of the vehicle 16. The second linear actuator 32 is positioned to pivot the bulb 24 in a second plane 40, which is substantially perpendicular to the first plane 34.

Each of the first linear actuator 30 and the second linear actuator 32 comprises a motor 42, a pinion gear 44, and a rack gear 46, or other actuating means, such as, but not limited to, hydraulic cylinders, pneumatic cylinders, and the like. The motor 42 is engaged to the first housing 18 and is reversible. The pinion gear 44 is engaged to a shaft 48 of the motor 42. The rack gear 46 is engaged to the bulb 24 and extends into the interior space 20. The rack gear 46 is gearedly engaged to the pinion gear 44 so that the motor 42 is positioned to selectively turn the pinion gear 44 to position the bulb 24 relative to the first housing 18.

A plurality of first connectors 50 is engaged to a rear 52 of the first housing 18. The first connectors 50 are operationally engaged to the bulb 24 and the actuator 28. Each first connector 50 is configured to engage an associated second connector (not shown), which is positioned in the opening 22, so that the bulb 24 and the actuator 28 are electrically engaged to an electrical circuit of the vehicle 16.

Figure 6:
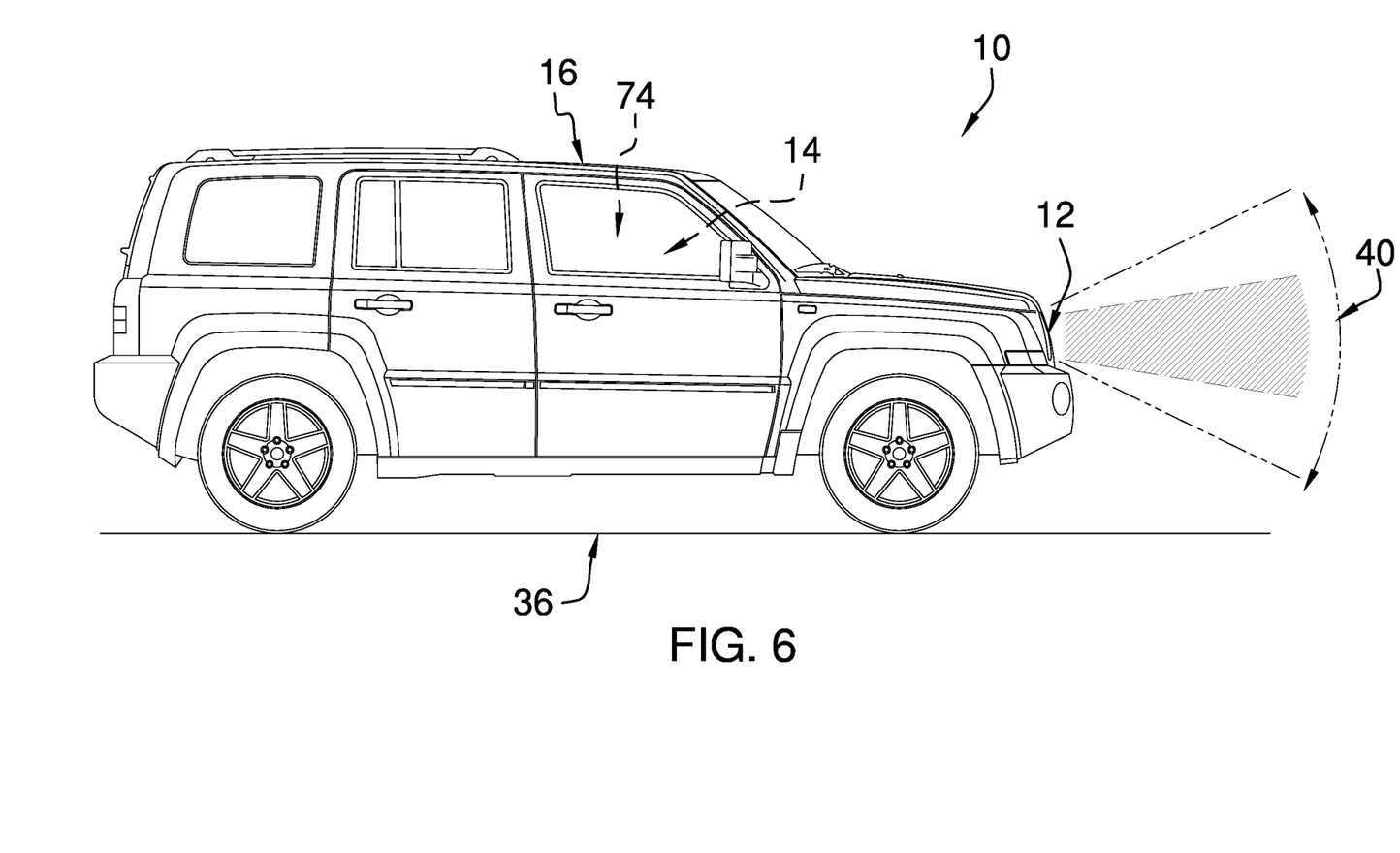
FIG. 6 is an in-use view of an embodiment of the disclosure.
Figure 7:
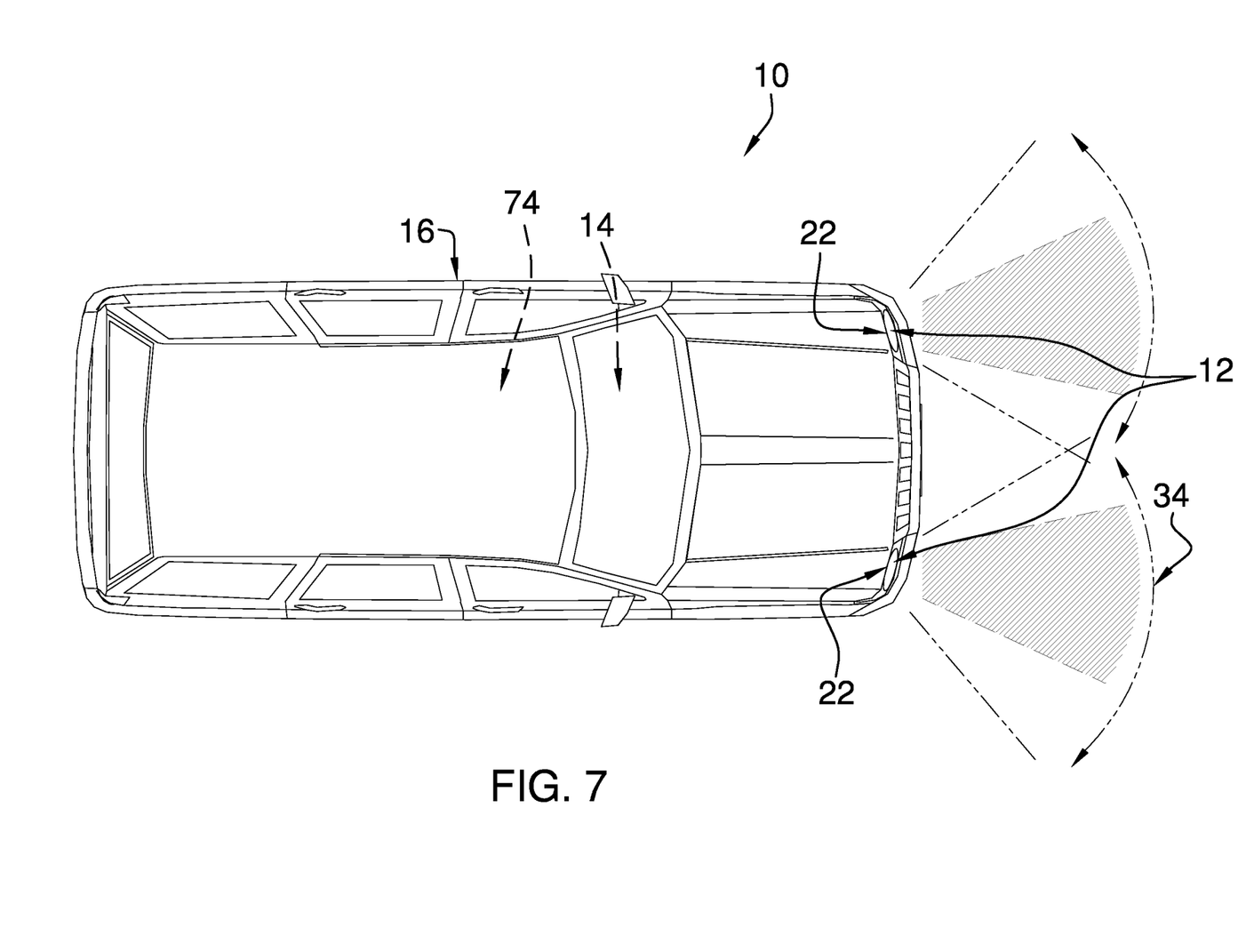
FIG. 7 is an in-use view of an embodiment of the disclosure.

The controller 14 is configured to be mountable within a passenger compartment 74 of the vehicle 16, so that the controller 14 is accessible to a driver of the vehicle 16. For example, the controller 14 could be affixed to a surface of a dash using adhesive, hook and look fasteners, or the like. The controller 14 is independently and operationally engaged to each of the actuators 28 and thus is positioned to selectively actuate each actuator 28 to direct light emitted by an associated bulb 24. The present invention is anticipated to be using is selectively positioning the bulbs 24 to direct light as might be most beneficial in a particular driving situation, such as in fog, on narrow or poorly striped roads, and the like. Relative to prior art headlamps, the directional headlamp assembly 10 provides greater vertical and lateral ranges within which light can be directed, as shown in FIGS. 6 and 7, respectively.

The present invention anticipates the controller 14 being either wiredly or wirelessly engaged to the actuator 28 by means known to those skilled in the art of controls for actuating means. The present invention also anticipates both the controller 14 and the pair of headlamp modules 12 being integral to the vehicle 16.

Figure 1:
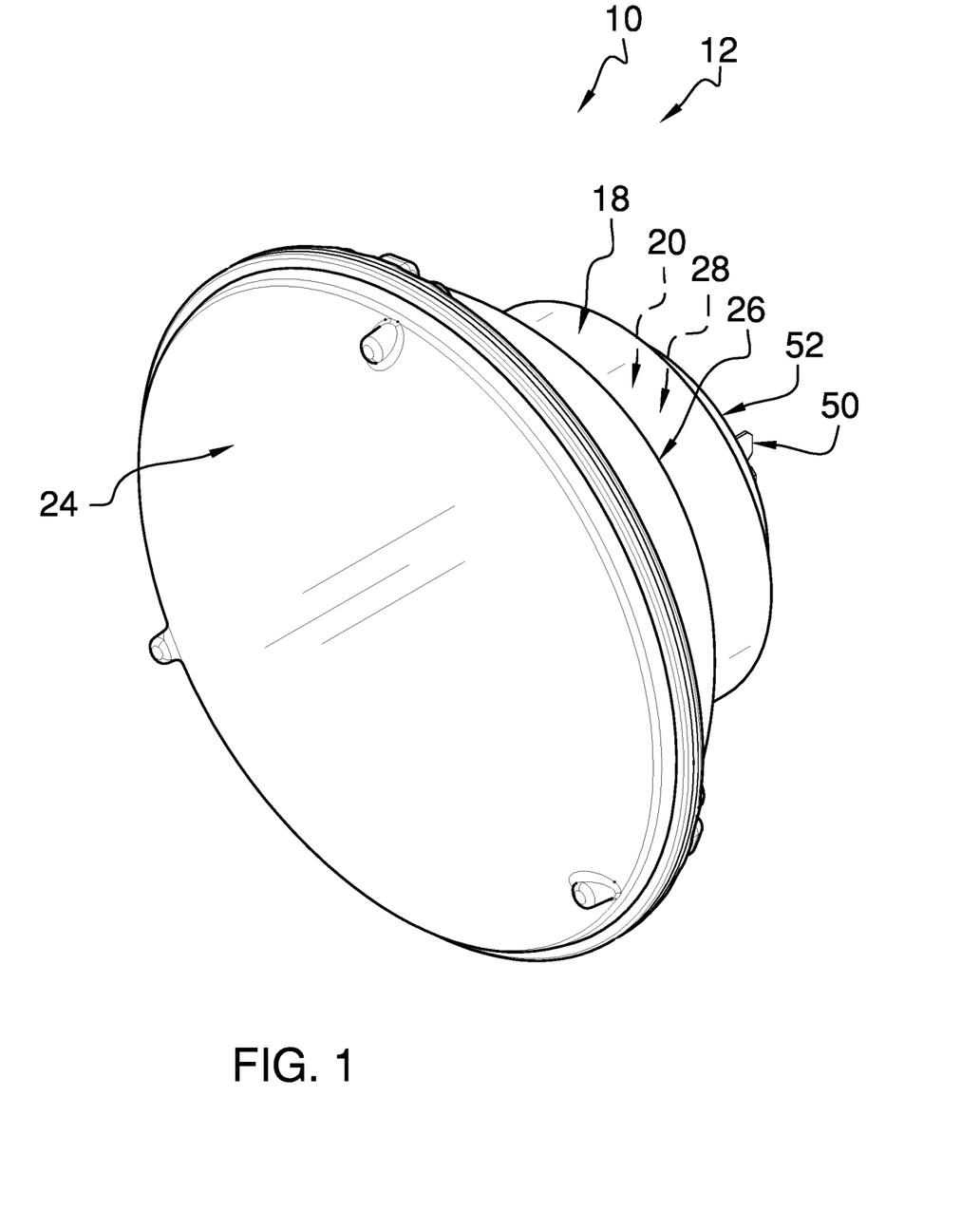
FIG. 1 is a front isometric isometric perspective of a directional headlamp assembly according to an embodiment of the disclosure.
Figure 2:
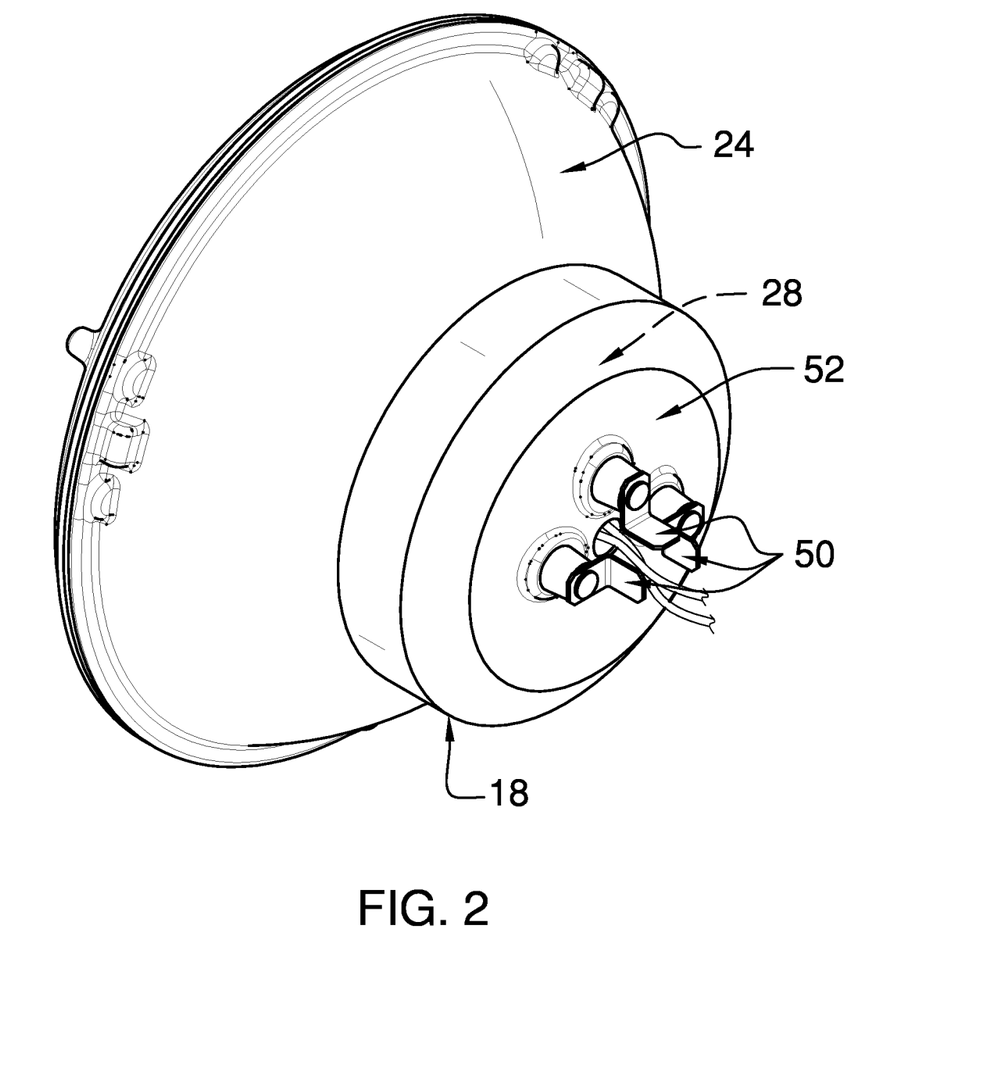
FIG. 2 is a rear isometric perspective view of an embodiment of the disclosure.
Figure 3:
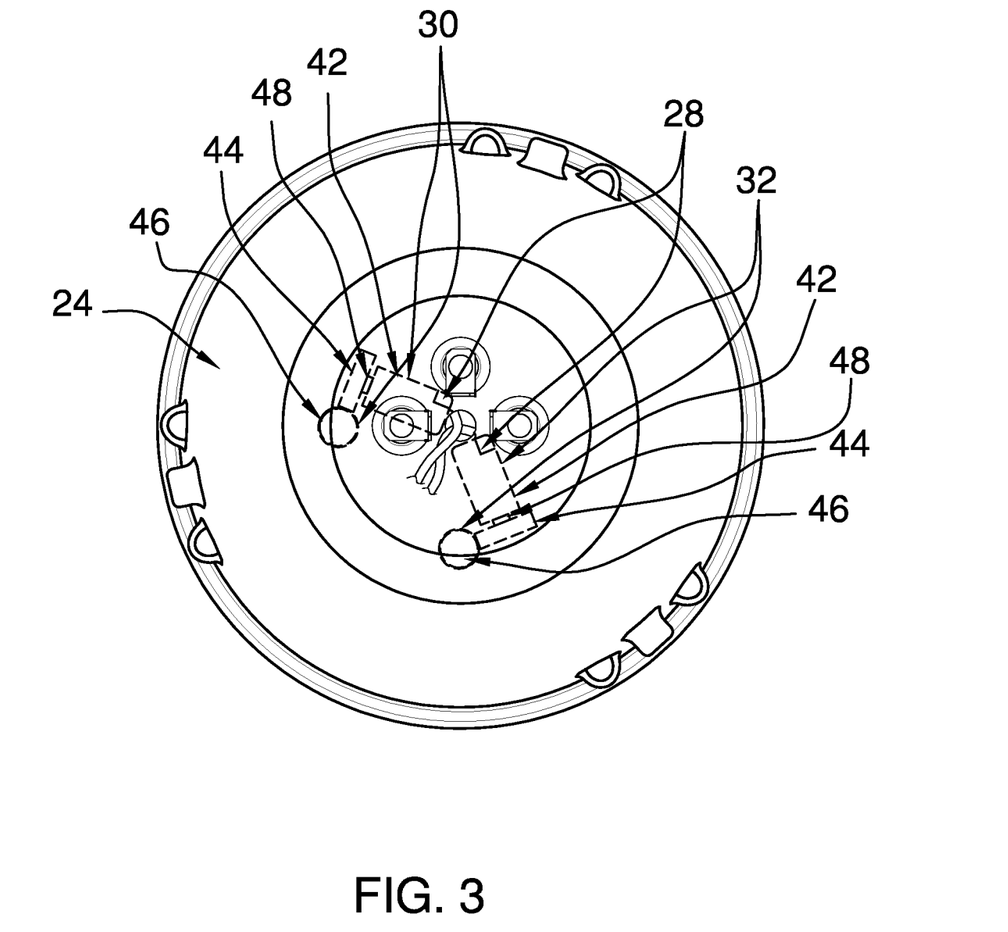
FIG. 3 is a rear view of an embodiment of the disclosure.
Figure 4:
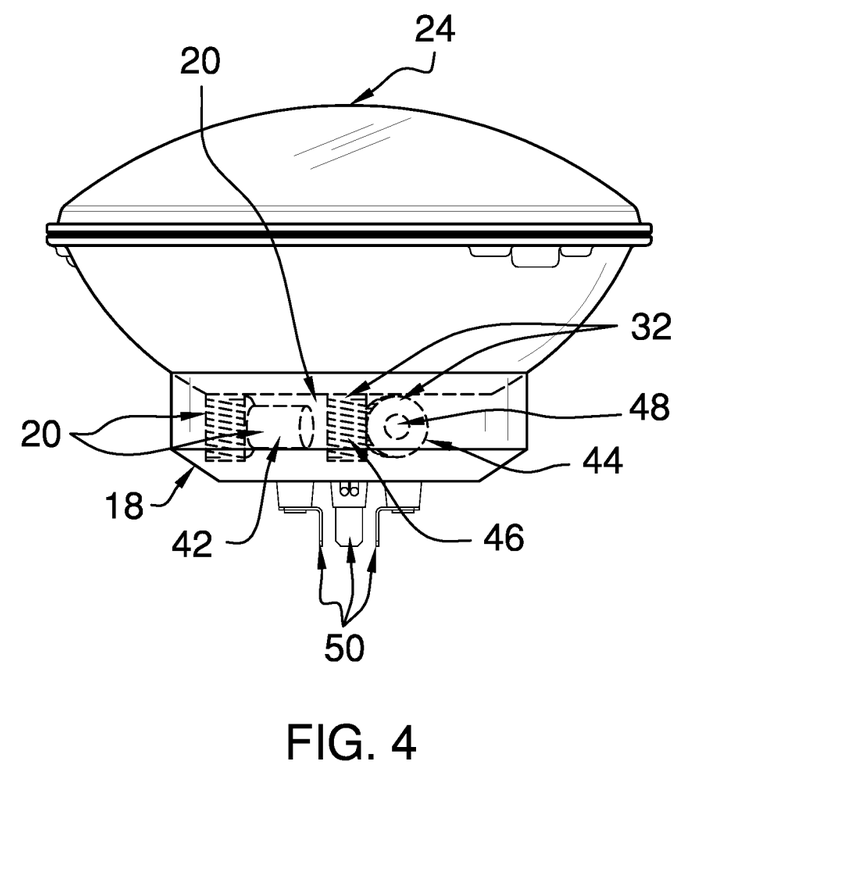
FIG. 4 is a bottom of an embodiment of the disclosure.
Figure 5:
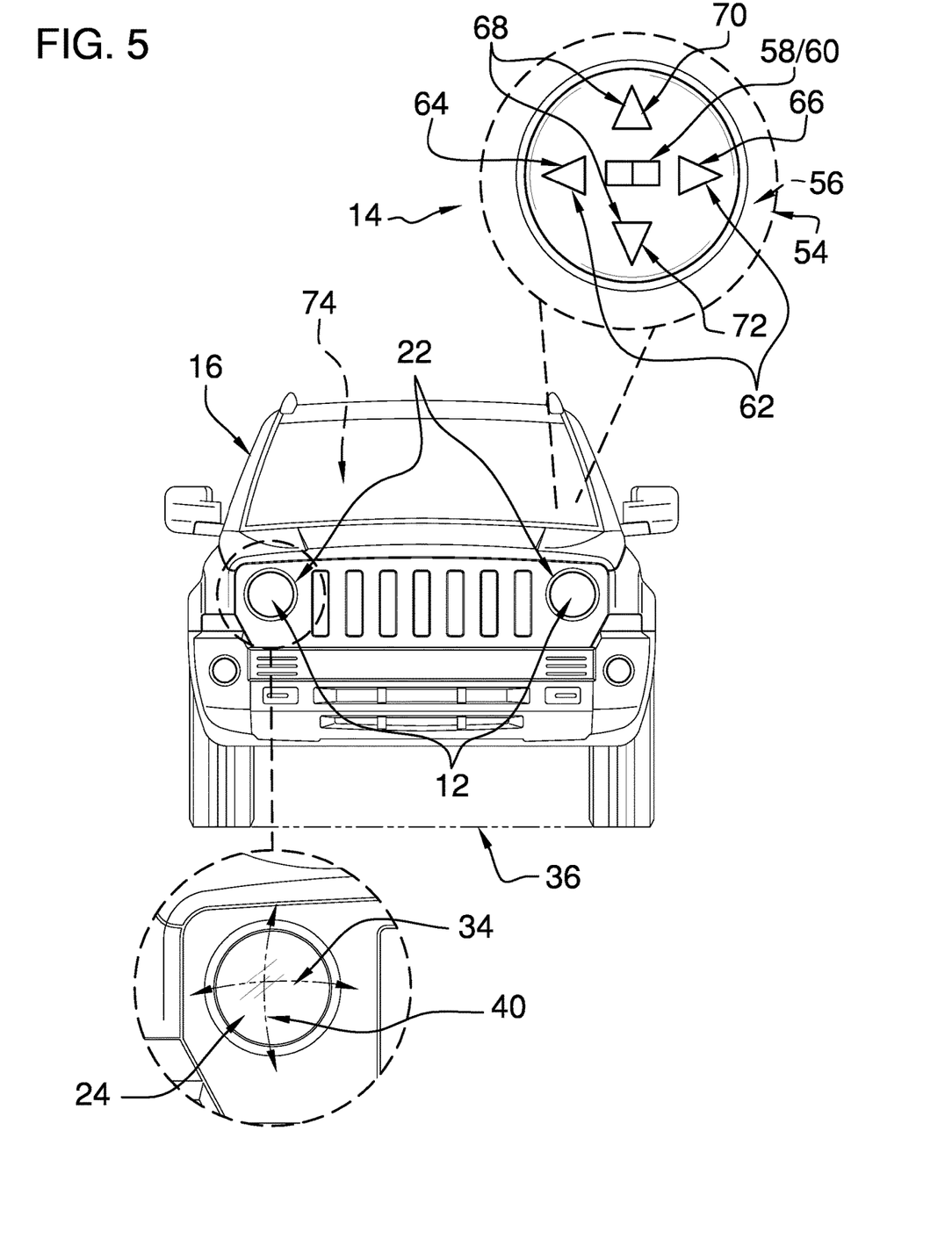
FIG. 5 is an in-use view of an embodiment of the disclosure.

The controller 14 comprises a second housing 54, which defines an internal space 56. A selector 58 is engaged to the second housing 54 and is positioned to signal the controller 14 to engage, selectively and operationally, one or the other of the headlamp modules 12. The selector 58 may comprise a toggle switch 60, as shown in FIG. 5, or other selecting means, such as, but not limited to, slide switches, button switches, touch screen display buttons, and the like.

A horizontal control element 62 is engaged to the second housing 54. The horizontal control element 62 is positioned to signal the actuator 28 to pivot the bulb 24 in the first plane 34, which is substantially parallel to the plane 36 defined by the wheels 38 of the vehicle 16. The horizontal control element 62 may comprise a left button 64 and a right button 66, as shown in FIG. 5, or other control element, such as, but not limited to, dials, slides, and the like.

A vertical control element 68 is engaged to the second housing 54. The vertical control element 68 is positioned to signal the actuator 28 to pivot the bulb 24 in the second plane 40, which is substantially perpendicular to the first plane 34. The vertical control element 68 may comprise an up button 70 and a down button 72, as shown in FIG. 5, or other control element, such as, but not limited to, dials, slides, and the like.

In use, each headlamp module 12 is positioned a respective opening 22 created by removing an existing pair of headlamps from a vehicle 16. The first connectors 50 engage the second connectors to provide power to the actuators 28 and the bulbs 24. With the controller 14 mounted in the passenger compartment 74, a driver is positioned to direct light from the bulbs 24 as needed for any particular driving situation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A directional headlamp assembly comprising:
    a pair of headlamp modules, each headlamp module being configured for replacing a respective headlamp of a pair of existing headlamps of a vehicle, the headlamp module comprising:
        a first housing defining an interior space and being configured for inserting into an opening created upon removal of the respective headlamp, such that the first housing is engaged to the vehicle, and
        a bulb pivotally engaged to a front of the first housing;
    an actuator engaged to the first housing, positioned in the interior space, and being operationally engaged to the bulb;
    a controller configured to be mountable within a passenger compartment of the vehicle, such that the controller is accessible to a driver of the vehicle, the controller being independently and operationally engaged to each of the actuators, such that the controller is positioned for selectively actuating each actuator for directing light emitted by an associated bulb; and
    wherein the actuator comprises a first linear actuator and a second linear actuator, the first linear actuator being positioned at 90° relative to the second linear actuator, such the first linear actuator is positioned for pivoting the bulb in a first plane substantially parallel to a plane defined by wheels of the vehicle, and such that the second linear actuator is positioned for pivoting the bulb in a second plane substantially perpendicular to the first plane.

2. The directional headlamp assembly of claim 1, wherein each of the first linear actuator and the second linear actuator comprises:
- a motor engaged to the first housing, the motor being reversible;
- a pinion gear engaged to a shaft of the motor; and
- a rack gear engaged to the bulb and extending into the interior space, the rack gear being gearedly engaged to the pinion gear, such that the motor is positioned for selectively turning the pinion gear for positioning the bulb relative to the first housing.

3. The directional headlamp assembly of claim 1, further including a plurality of first connectors engaged to a rear of the first housing, the first connectors being operationally engaged to the bulb and the actuator, wherein each first connector is configured for engaging an associated second connector positioned in the opening, such that the bulb and the actuator are electrically engaged to an electrical circuit of the vehicle.

4. A directional headlamp assembly comprising:
- a pair of headlamp modules, each headlamp module being configured for replacing a respective headlamp of a pair of existing headlamps of a vehicle, the headlamp module comprising:
  - a first housing defining an interior space and being configured for inserting into an opening created upon removal of the respective headlamp, such that the first housing is engaged to the vehicle, and
  - a bulb pivotally engaged to a front of the first housing;
- an actuator engaged to the first housing, positioned in the interior space, and being operationally engaged to the bulb;
- a controller configured to be mountable within a passenger compartment of the vehicle, such that the controller is accessible to a driver of the vehicle, the controller being independently and operationally engaged to each of the actuators, such that the controller is positioned for selectively actuating each actuator for directing light emitted by an associated bulb; and
- wherein the controller comprises:
  - a second housing defining an internal space;
  - a selector engaged to the second housing, such that the selector is positioned for signaling the controller for selectively operationally engaging one or the other of the headlamp modules;
  - a horizontal control element engaged to the second housing, such that the horizontal control element is positioned for signaling the actuator for pivoting the bulb in a first plane substantially parallel to a plane defined by wheels of the vehicle; and
  - a vertical control element engaged to the second housing, such that the vertical control element is positioned for signaling the actuator for pivoting the bulb in a second plane substantially perpendicular to the first plan.

5. The directional headlamp assembly of claim 4, wherein the selector comprises a toggle switch.

6. The directional headlamp assembly of claim 4, wherein:
- the horizontal control element comprising a left button and a right button; and
- the vertical control element comprising an up button and a down button.

7. A directional headlamp system comprising:
- a vehicle;
- a pair of headlamp modules mounted to the vehicle, each head headlamp module comprising:
  - a first housing defining an interior space,
  - a bulb pivotally engaged to a front of the first housing, and
  - an actuator engaged to the first housing, positioned in the interior space, and being operationally engaged to the bulb;
- a controller mounted within a passenger compartment of the vehicle, such that the controller is accessible to a driver of the vehicle, the controller being independently and operationally engaged to each of the actuators, such that the controller is positioned for selectively actuating each actuator for directing light emitted by an associated bulb; and
- wherein the actuator comprises a first linear actuator and a second linear actuator, the first linear actuator being positioned at 90° relative to the second linear actuator, such the first linear actuator is positioned for pivoting the bulb in a first plane substantially parallel to a plane defined by wheels of the vehicle, and such that the second linear actuator is positioned for pivoting the bulb in a second plane substantially perpendicular to the first plane.

8. The directional headlamp system of claim 7, wherein each of the first linear actuator and the second linear actuator comprises:
- a motor engaged to the first housing, the motor being reversible;
- a pinion gear engaged to a shaft of the motor; and
- a rack gear engaged to the bulb and extending into the interior space, the rack gear being gearedly engaged to the pinion gear, such that the motor is positioned for selectively turning the pinion gear for positioning the bulb relative to the first housing.

9. A directional headlamp system comprising:
- a vehicle;
- a pair of headlamp modules mounted to the vehicle, each head headlamp module comprising:
  - a first housing defining an interior space,
  - a bulb pivotally engaged to a front of the first housing, and
  - an actuator engaged to the first housing, positioned in the interior space, and being operationally engaged to the bulb;
- a controller mounted within a passenger compartment of the vehicle, such that the controller is accessible to a driver of the vehicle, the controller being independently and operationally engaged to each of the actuators, such that the controller is positioned for selectively actuating each actuator for directing light emitted by an associated bulb; and
- wherein the controller comprises:
  - a second housing defining an internal space;
  - a selector engaged to the second housing, such that the selector is positioned for signaling the controller for selectively operationally engaging one or the other of the headlamp modules;
  - a horizontal control element engaged to the second housing, such that the horizontal control element is positioned for signaling the actuator for pivoting the bulb in a first plane substantially parallel to a plane defined by wheels of the vehicle; and
  - a vertical control element engaged to the second housing, such that the vertical control element is positioned for signaling the actuator for pivoting the bulb in a second plane substantially perpendicular to the first plan.

10. The directional headlamp system of claim 9, wherein the selector comprises a toggle switch.

11. The directional headlamp system of claim 9, wherein:
the horizontal control element comprising a left button and a right button; and
the vertical control element comprising an up button and a down button.

12. A directional headlamp assembly comprising:
a pair of headlamp modules, each headlamp module being configured for replacing a respective headlamp of a pair of existing headlamps of a vehicle, the headlamp module comprising:
  a first housing defining an interior space and being configured for inserting into an opening created upon removal of the respective headlamp, such that the first housing is engaged to the vehicle,
  a bulb pivotally engaged to a front of the first housing,
  an actuator engaged to the first housing, positioned in the interior space, and being operationally engaged to the bulb, the actuator comprising a first linear actuator and a second linear actuator, the first linear actuator being positioned at 90° relative to the second linear actuator, such the first linear actuator is positioned for pivoting the bulb in a first plane substantially parallel to a plane defined by wheels of the vehicle, and such that the second linear actuator is positioned for pivoting the bulb in a second plane substantially perpendicular to the first plane, each of the first linear actuator and the second linear actuator comprising:
    a motor engaged to the first housing, the motor being reversible,
    a pinion gear engaged to a shaft of the motor, and
    a rack gear engaged to the bulb and extending into the interior space, the rack gear being gearedly engaged to the pinion gear, such that the motor is positioned for selectively turning the pinion gear for positioning the bulb relative to the first housing, and
  a plurality of first connectors engaged to a rear of the first housing, the first connectors being operationally engaged to the bulb and the actuator, wherein each first connector is configured for engaging an associated second connector positioned in the opening, such that the bulb and the actuator are electrically engaged to an electrical circuit of the vehicle; and
a controller configured to be mountable within a passenger compartment of the vehicle, such that the controller is accessible to a driver of the vehicle, the controller being independently and operationally engaged to each of the actuators, such that the controller is positioned for selectively actuating each actuator for directing light emitted by an associated bulb, the controller comprising:
  a second housing defining an internal space,
  a selector engaged to the second housing, such that the selector is positioned fir signaling the controller for selectively operationally engaging one or the other of the headlamp modules, the selector comprising a toggle switch,
  a horizontal control element engaged to the second housing, such that the horizontal control element is positioned for signaling the actuator for pivoting the bulb in the first plane substantially parallel to the plane defined by the wheels of the vehicle, the horizontal control element comprising a left button and a right button, and
  a vertical control element engaged to the second housing, such that the vertical control element is positioned for signaling the actuator for pivoting the bulb in the second plane substantially perpendicular to the first plane, the vertical control element comprising an up button and a down button.

\* \* \* \* \*